(12) United States Patent
Per et al.

(10) Patent No.: US 10,360,108 B2
(45) Date of Patent: Jul. 23, 2019

(54) SYSTEM AND METHOD OF USING PERFORMANCE-MAINTAINING COMMANDS FOR GENERATING A BACKUP OF UNSUPPORTED FILE SYSTEMS

(71) Applicant: Acronis International GmbH, Schaffhausen (CH)

(72) Inventors: Yuri Per, Dolgoprudny (RU); Stanislav Protasov, Moscow (RU); Mark Shmulevich, Moscow (RU); Serguei Beloussov, Singapore (SG)

(73) Assignee: ACRONIS INTERNATIONAL GMBH, Schaffhausen (CH)

( * ) Notice: Subject to any disclaimer, the term of this patent is extended or adjusted under 35 U.S.C. 154(b) by 587 days.

(21) Appl. No.: 14/987,868

(22) Filed: Jan. 5, 2016

(65) Prior Publication Data
US 2017/0192851 A1    Jul. 6, 2017

(51) Int. Cl.
*G06F 17/30*    (2006.01)
*G06F 11/14*    (2006.01)
*G06F 16/11*    (2019.01)

(52) U.S. Cl.
CPC ...... *G06F 11/1451* (2013.01); *G06F 11/1458* (2013.01); *G06F 16/11* (2019.01)

(58) Field of Classification Search
CPC .................... G06F 11/1417; G06F 11/4151
USPC ................ 711/114, 118, 151, 167, 103, 166; 707/647
See application file for complete search history.

(56) References Cited

U.S. PATENT DOCUMENTS

| | | | | |
|---|---|---|---|---|
| 7,937,545 B1* | 5/2011 | Wu | ...................... | G06F 11/1448 709/219 |
| 8,312,259 B1* | 11/2012 | Dyatlov | .............. | G06F 11/1417 711/114 |
| 9,128,973 B1* | 9/2015 | Murugesan | ....... | G06F 17/30368 |
| 9,959,278 B1* | 5/2018 | Khanduja | ............. | G06F 16/128 |
| 2009/0172326 A1* | 7/2009 | Sandorfi | ............. | G06F 11/1448 711/162 |
| 2011/0004459 A1* | 1/2011 | Collins | .................. | G06F 3/0605 703/24 |
| 2012/0110249 A1* | 5/2012 | Jeong | ..................... | G06F 3/0616 711/103 |
| 2014/0372685 A1* | 12/2014 | Jeong | ..................... | G06F 3/0616 711/103 |
| 2015/0074371 A1* | 3/2015 | Hashimoto | ............... | G06F 3/06 711/202 |

(Continued)

*Primary Examiner* — Jean M Corrielus
(74) *Attorney, Agent, or Firm* — Arent Fox LLP; Michael Fainberg (57) ABSTRACT

A system and method is disclosed for using performance-maintaining commands for generating backup data of an unsupported file system. An example method includes intercepting a plurality of data storage commands transmitted from the file system to a storage device, where the plurality of data storage commands indicating sectors of the memory of the computer that do not contain valid data. The method further includes analyzing the plurality of data storage commands to determine sectors of the memory that contains valid data, generating a data structure that indicates the sectors of the memory that contain valid data and the sector of the memory that do not contain valid data, and subsequently generating the backup data copy of the memory of the computer based on the data structure.

21 Claims, 7 Drawing Sheets

(56) References Cited

U.S. PATENT DOCUMENTS

2015/0143032 A1\* 5/2015 Hashimoto ............. G06F 3/061
 711/103
2017/0024156 A1\* 1/2017 Hashimoto ............. G06F 3/061

\* cited by examiner

SYSTEM AND METHOD OF USING PERFORMANCE-MAINTAINING COMMANDS FOR GENERATING A BACKUP OF UNSUPPORTED FILE SYSTEMS

FIELD OF TECHNOLOGY

The present disclosure generally relates to the field of electronic data backup, and, more specifically, to a system and method for using performance-maintaining commands for generating backup data of an unsupported file system.

BACKGROUND

The use of computing devices, such as personal computers, tablets, smartphones and the like, is widespread today. These computing devices use binary files that, if corrupted, or in the event of a failure of the equipment where they are stored, can lead to a loss of valuable information which sometimes cannot be replaced, leading to economic consequences.

In order to recover a computer system from a catastrophic failure of the data storage device, such as a disk, it is not only necessary to replace the hardware, but it is also necessary to be able to restore the data and software configuration. To protect against such loss, it is standard business practice to maintain a backup data storage device set that consists of an up-to-date image of the operating system, applications software and the data files. Thus, modern computing devices are equipped with storage devices to make copies of such files. These storages devices include high capacity storage disks with writable CD ROMS, or the like.

Figure 1:
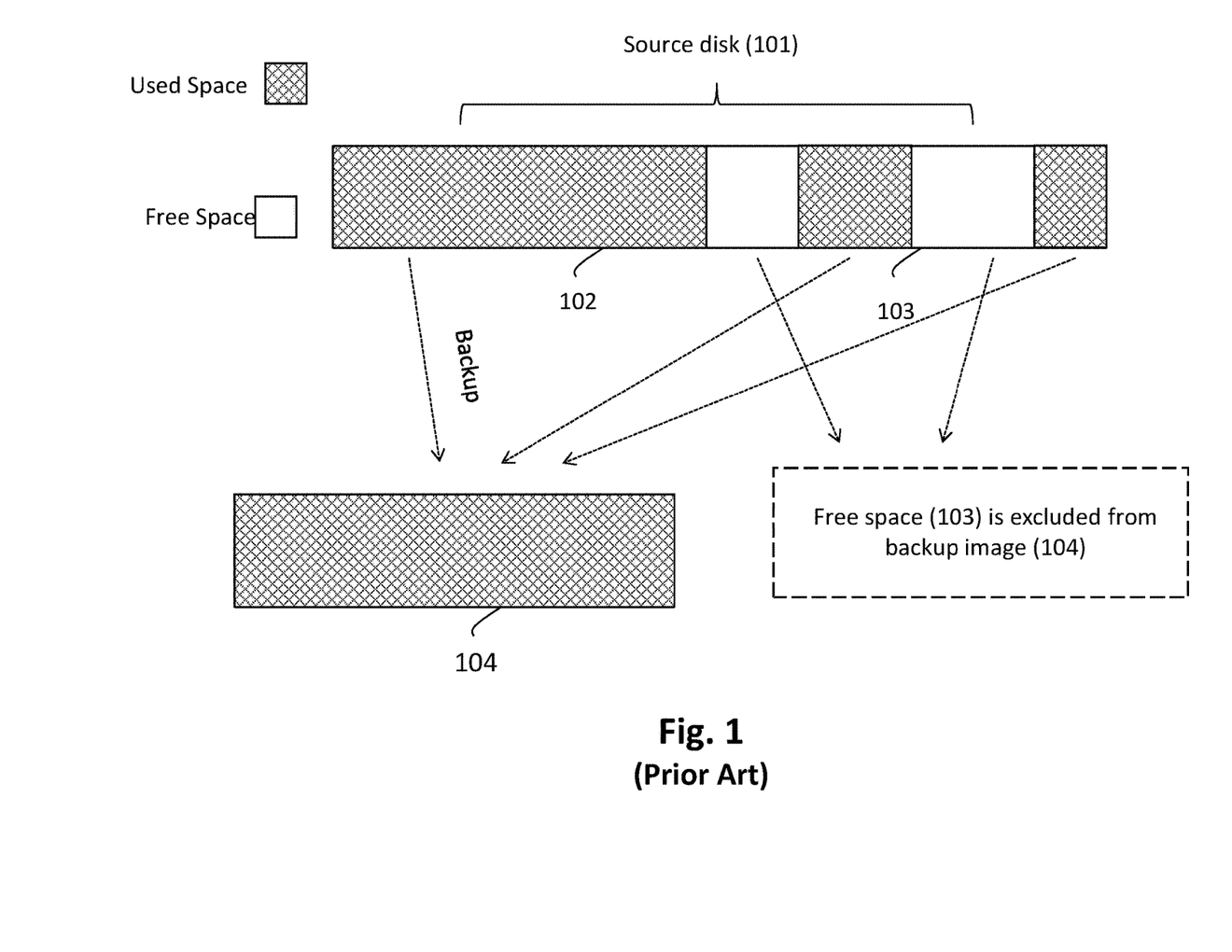
FIG. 1 illustrates a representative data backup process according to a conventional method.

Current computing devices utilize processes of backing up data by creating a disk image (i.e., an image backup) while excluding unused or "free" space from the image in order to save space in the data storage system or device as a whole. For example, FIG. 1 illustrates a representative data backup process according to a conventional method. As shown, a source disk 101 of a computing device, for example, includes used space 102 (denoted by cross hatchings) and free space 103. According to such convention methods, when a computing device generates a backup image 104, the backup image only contains used space or actual data of the source disk 101. The free space 103 is excluded from the backup image 104.

According to such conventional computing devices and backup methods, the free space 103 can typically be excluded from the final backup image 104 because the backup application (i.e., a backup software application, backup agent or the like) has the support of the file system in that the backup application knows how the data is arranged and can understand which sectors of the memory are filled with data and which sectors of the memory are free.

However, in other instances, the backup application may attempt to make a backup of the partition or disk with an unsupported file system. In these cases, the computing device can use a so-called "RAW" backup method where the whole partition or disk is backed up sector-by-sector, regardless of whether each sector contains any valid data or does not contain data. Of course, it should be appreciated that this "RAW" backup method does not eliminate unused or free space of the final image. Accordingly, there is a need for a data backup process for such unsupported file systems, i.e., the file system of the computing device is not support by the backup software application.

SUMMARY

Thus, the present disclosure provides an effective solution for the foregoing problems by using performance-maintaining commands for generating backup data of an unsupported file system. Disclosed are example systems, methods and computer program products for performing the improved data storage technique described herein.

According to one aspect, a method is disclosed for generating a backup data copy of memory of a computer having a file system unsupported by a backup software application. According to this aspect, the method include intercepting, by a processor, a plurality of data storage commands transmitted from the file system to a storage device, the plurality of data storage commands indicating at least one sector of the memory of the computer that does not contain valid data; analyzing, by the processor, the plurality of data storage commands to determine at least one sector of the memory of the computer that contains valid data; generating, by the processor, a bitmap that indicates the at least one sector of the memory that does not contain valid data and the least one sector of the memory that contains valid data; storing the bitmap in the memory; and generating, by the processor, the backup data copy of the memory of the computer based on the bitmap.

According to an alternative aspect, the method includes transmitting, by the processor, to an operating system of the computer a signal confirming that the processor supports the plurality of data storage commands.

According to an alternative aspect, the bitmap indicates a plurality of sectors of the memory that contain valid data.

According to an alternative aspect, the method includes determining, by the processor, whether the file system is supported by the backup software application stored in the memory of the computer; and generating, by the processor, the backup data copy of the memory of the computer not using the bitmap if the file system is supported by the backup software application stored in the memory of the computer.

According to an alternative aspect, the method includes determining, by the processor, whether the file system is supported by the backup software application stored in the memory of the computer; determining, by the processor, whether the file system supports the plurality of data storage commands; and generating, by the processor, the backup data copy of the memory of the computer on a sector-by-sector basis if the file system is not supported by the existing backup software application stored in the memory of the computer and the file system does not supports the plurality of data storage commands.

According to an alternative aspect, the plurality of data storage commands are at least one of a TRIM command and an UNMAP command.

According to an alternative aspect, the storage device comprises a solid-state drive.

According to one aspect, a computer system is disclosed for generating a backup copy of data. According to this aspect, the system includes electronic memory storing the data and a backup software application; a file system; and a processor configured to intercept a plurality of data storage commands transmitted from the file system to a storage device, the plurality of data storage commands indicating at least one sector of the electronic memory of the computer that does not contain valid data; analyze the plurality of data storage commands to determine at least one sector of the memory of the computer that contains valid data; generate a bitmap that indicates the at least one sector of the memory that does not contain valid data and the least one sector of the electronic memory that contains valid data; store the bitmap in the electronic memory; and generate the backup data copy of the data stored in the electronic memory of the computer based on the bitmap.

According to another aspect, a non-transitory computer readable medium storing computer executable instructions is disclosed for generating a backup data copy of memory of a computer having a file system unsupported by a backup software application. In this aspect, the non-transitory computer readable medium includes instructions for intercepting a plurality of data storage commands transmitted from the file system to a storage device, the plurality of data storage commands indicating at least one sector of the memory of the computer that does not contain valid data; analyzing the plurality of data storage commands to determine at least one sector of the memory of the computer that contains valid data; generating a bitmap that indicates the at least one sector of the memory that does not contain valid data and the least one sector of the memory that contains valid data; storing the bitmap in the memory; and generating the backup data copy of the memory of the computer based on the bitmap.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Various aspects of the invention are now described with reference to the drawings, wherein like reference numerals are used to refer to like elements throughout. In the following description, for purposes of explanation, numerous specific details are set forth in order to promote a thorough understanding of one or more aspects of the invention. It may be evident in some or all instances, however, that any aspects described below can be practiced without adopting the specific design details described below. In other instances, well-known structures and devices are shown in block diagram form in order to facilitate description of one or more aspects. The following presents a simplified summary of one or more aspects of the invention in order to provide a basic understanding thereof.

As described herein, a method and system is disclosed for using performance-maintaining commands for generating backup data of an unsupported file system. In general, a file system in computing can be considered a system that implements method and/or algorithms for storing and organizing computer files and the data they contain on the computing device to facilitate ease of identification and access of such data.

Virtually all modern file systems support the specification of interface commands under "SCSI" standards. It is through this interface that data can be exchanged between the file system of the computing device and the physical storage device. "SCSI" is a set of standards for physically connecting and transferring data between the computing devices and the peripheral devices, such as physical data storage devices. The SCSI standards provide device commands, protocols, and the electrical and optical interfaces and are most commonly used for the physical data storage devices (e.g., hard disk drives, tape drives, CD drives and the like).

One command in the ATA command (and known as UNMAP in the SCSI command set) is a "TRIM" command. The TRIM command can be considered a performance-maintaining command that is typically used for optimization of data writing processes on solid-state drive ("SSD") disks, which have a limited number of possible rewrite cycles. For example, TRIM commands allow an operating system of the client computer to inform a SSD of the blocks of data that are no longer considered in use (e.g., do not contain valid data) and can be wiped internally.

In one aspect, the TRIM command is called in situations where a particular sector or block on the physical data storage device or medium (e.g., SSD) is freed and the data stored therein is no longer needed and can be overwritten. In general, a sector of the SSD can be considered a segment or data block as would be understood to one skilled in the art. In one aspect, the specificity of the TRIM command can be used not only when using SSD, but with any other physical data storage medium as should be understood to one skilled in the art, and it does not matter whether such device supports this command. According to an exemplary aspect, the system and method disclosed herein utilizes these performance-maintaining commands to generate backup data of an unsupported file system as will be described in detail below.

Figure 2:
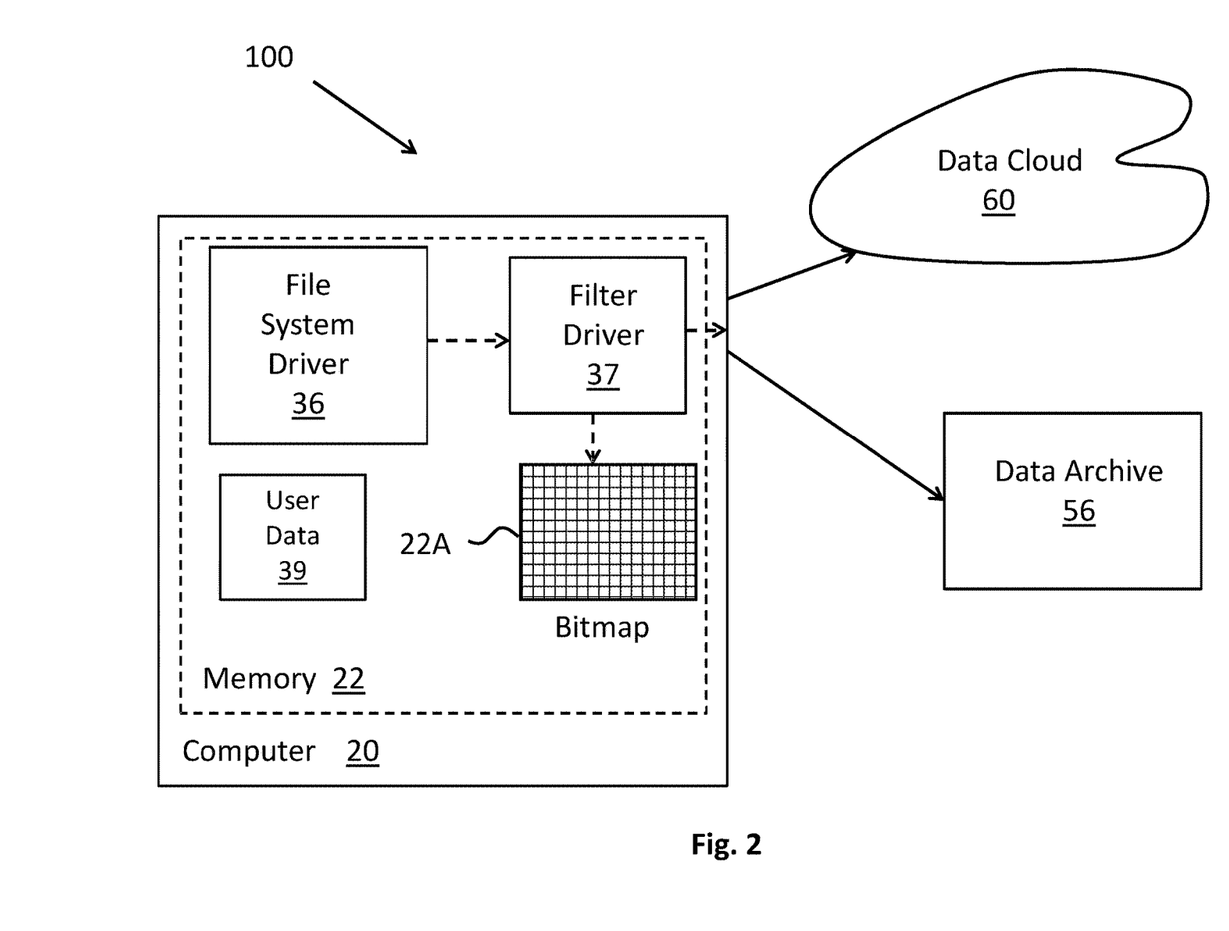
FIG. 2 illustrates a system for using performance-maintaining commands for generating backup data of an unsupported file system according to an exemplary aspect.

FIG. 2 illustrates a system 100 for using performance-maintaining commands for generating backup data of an unsupported file system according to an exemplary aspect. As shown, a computer 20 comprises memory 22 that can contain electronic data (e.g., user data) to be backed up. The memory 22 may be any type of device for storing digital information such as a hard drive, flash memory, disk, or tape, and will generally be described as a "disk" or "hard disk" of the client computer in this disclosure. A more detailed explanation of a general purpose computer for implementing the disclosed system and method will be described below with respect to FIG. 6.

As further shown, the memory 22 of computer 20 can include a file system driver 36 and a filter driver 37. As will be explained in detail below, the filter driver 37 is configured to generate a bitmap 22A that can also be stored in memory 22, for example. Alternatively, the bitmap and one or more drivers can be stored in an alternative memory of the client computer as would be understood to one skilled in the art. The file system driver 36 of FIG. 2 can correspond to the file system 36 shown in FIG. 6 and the filter driver 37 can correspond as an application 37 of FIG. 6 according to an exemplary aspect. According to one aspect, the device drivers 36 and 37 shown in FIG. 2 are computer programs installed on the computer 20 and executable by a hardware processor of the computer 20, such as central processing unit 21 of FIG. 6.

Figure 6:
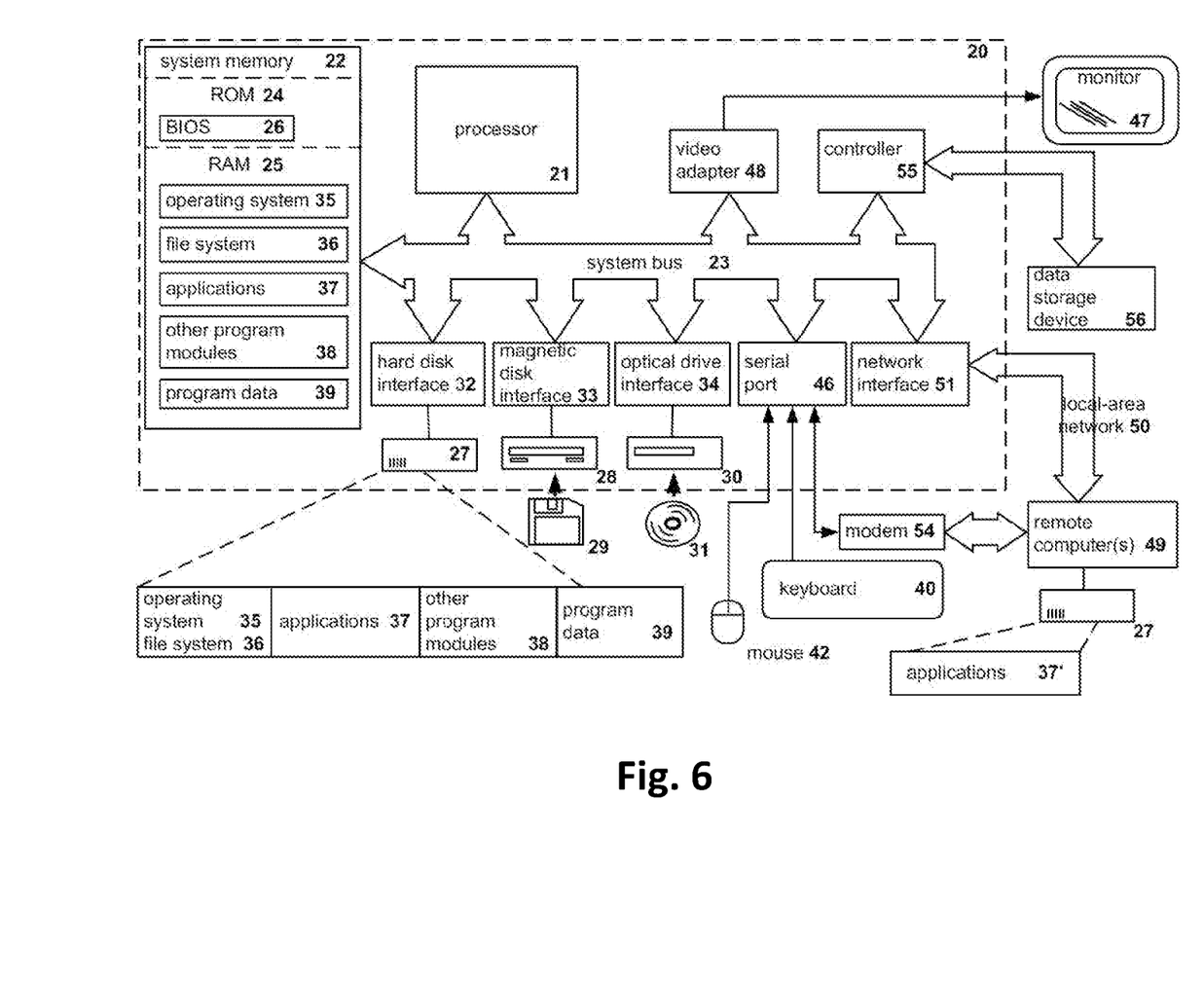
FIG. 6 illustrates an example of a general-purpose computer system on which the disclosed systems and method can be implemented.

According to the exemplary process described herein, the computer 20 is configured to back up data (e.g., user data 39) stored in memory 22 to a data archive 56 of a storage device (also described below for FIG. 6), for example, or it can be backed up to a remote storage device, such as in a data cloud, designated by numeral 60, and ultimately stored in a storage device. The user data 39 can correspond to the program data 39 as shown in FIG. 6 and described below, although this aspect should in no way be limited. Rather, the disclosed system and method can create a data backup of any type of electronic data stored on a client computer, for example, as would be understood to one of ordinary skill in the art. Moreover, the archive storage 56 may be any type of device that is locally or remotely coupled to the computer 20 and provided for storing digital information (e.g., the user data 39), such as a hard drive, flash memory, disk, tape, SSD or the like.

Referring further to FIG. 2, the filter driver 37 is communicatively disposed between the file system or file system driver 36 and the physical data storage device, such as data archive 56. According to one aspect, the filter driver 37 is a computer program that is provided to receive and analyze all commands and/or data transmitted between the file system and the physical data storage device. Specifically, according to one aspect, the filter driver 37 can intercept all or a portion of the commands transmitted from the file system 36 to the physical data storage device 56 and determine whether the commands are TRIM or UNMAP commands according to one aspect. It should be appreciated that even if the physical data storage device, such as data archive 56, does not support the intercepted TRIM or UNMAP command, the filter driver 37 is configured to emulate the responses of the file system 36 from the physical data storage device 56.

As further shown, the filter driver 37 is configured to generate a bitmap 22A based on the intercepted performance-maintaining commands, i.e., TRIM or UNMAP commands. According to the exemplary aspect, the bitmap 22A is a data structure that provides a type of memory organization or image file format used to store the user data 39 in memory 22 of computer 20, for example. In the context of the exemplary aspect, the bitmap 22A can be a bit array according to one aspect, but also more generally any data structure (for example, list of extents) that enables the system to determine if specific data block are in use or not in use. In other words, the bitmap 22A can alternatively be any data structure that reflects the sectors on the disk of computer 22 that are occupied and the sectors that are not so occupied. According to one further aspect, the filter driver 37 can be part of a special volume tracker. In more particularity, the filter driver 37 interprets the coded commands and uses the data therein to identify at least one of the sectors containing free space or the sectors containing valid data of the computer's disk. This data is then used to create a corresponding bitmap 22A.

Figure 3:
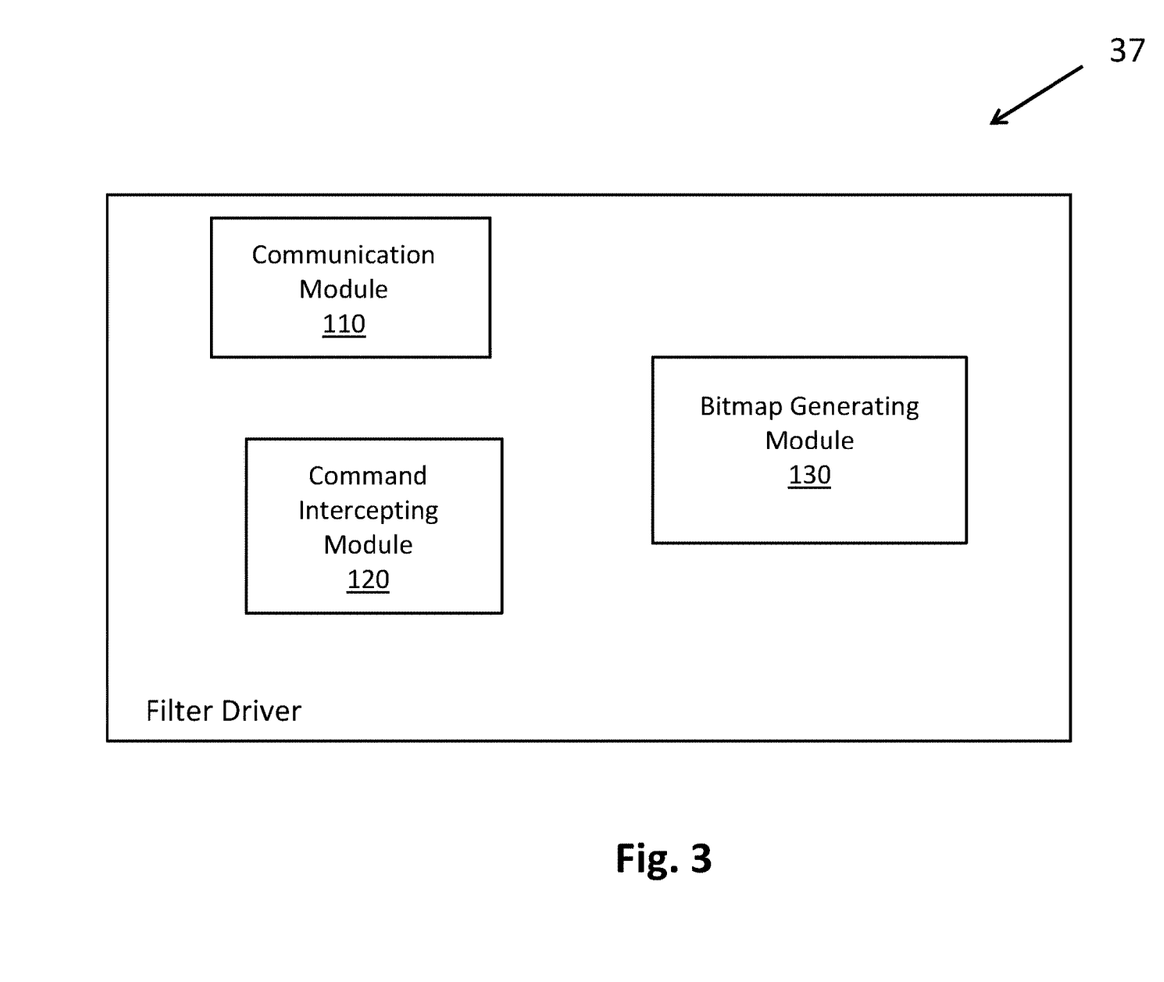
FIG. 3 illustrates a block diagram of a filter driver for using performance-maintaining commands for generating backup data of an unsupported file system according to an exemplary aspect.

FIG. 3 illustrates a block diagram of a filter driver 37 for using performance-maintaining commands for generating backup data of an unsupported file system according to an exemplary aspect. In particular, the filter driver 37 shown in FIG. 3 illustrates a more detailed view of the filter driver 37 of computer 20 described above with respect to FIG. 2 and includes a number for computer modules.

As described above, the client computer 20 includes memory 22 have filter driver 37. According to the exemplary embodiment shown in FIG. 3, the filter driver 37 can be composed of a plurality of modules. As used herein, the term "module" refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation exemplified herein.

As shown, the filter driver 37 can include communication module 110, command intercepting module 120 and bitmap generating module 130. The operations and/or algorithms performed for each of these modules will be described in detail below. However, according to the exemplary aspect, the communication module 110 is configured to perform the functions of receiving signals from the file system 36 of the client computer 20 and communicating with the file system 36, such as providing a signal confirming whether the filter driver 37 is capable of supporting the TRIM/UNMAP command.

Furthermore, the command intercepting module 120 is configured to intercept such TRIM commands and interpret these commands to determine which sectors of the disk of client computer 20 occupy valid data to be backed up and which sectors no longer contain such data and/or are occupied by free space. For example, the command intercepting module 120 can receive each command generated according to the SCSI standards by the file system driver 36 and analyze the commands to determine, based on the software instructions of the commands whether they are TRIM or UNMAP commands. Furthermore, as noted above, the TRIM commands are designed to enable the operating system to notify the storage device (e.g., the SSD) which sectors (or pages) no longer contain valid data due to erases either by the user or operating system itself. During a delete operation, the operating system of the client computer 20 will mark the sectors as free for new data and send a TRIM command to the storage device to mark them as not containing valid data. The command intercepting module 120 is configured to interpret these commands to also determine which sectors of the disk no longer contain valid data and, therefore, can be considered "free" space. In one aspect, it should be appreciated that the communication module 110 and command intercepting module 120 can be considered a single module according to an alternative aspect.

As further shown in FIG. 3, the filter driver 37 includes a bitmap generating module 130 configured to create a bitmap that reflects the sectors of the disk of client computer 20 to be backed up that occupy valid data as well as the sectors that no longer contain such valid data and/or are occupied by free space. As will be described in detail below, the bitmap (e.g., bitmap 22A of FIG. 2) can be used to create a snapshot during a backup. Because the bitmap indicates the sectors that are not occupied by data (i.e., the sectors contain free space) and/or the sector occupied by the valid data, the disclosed system and method is capable of generating a snapshot of the user data on the disk that is smaller than a conventional backup using the RAW data technique that includes all occupied and unoccupied sectors of the disk.

Figure 4:
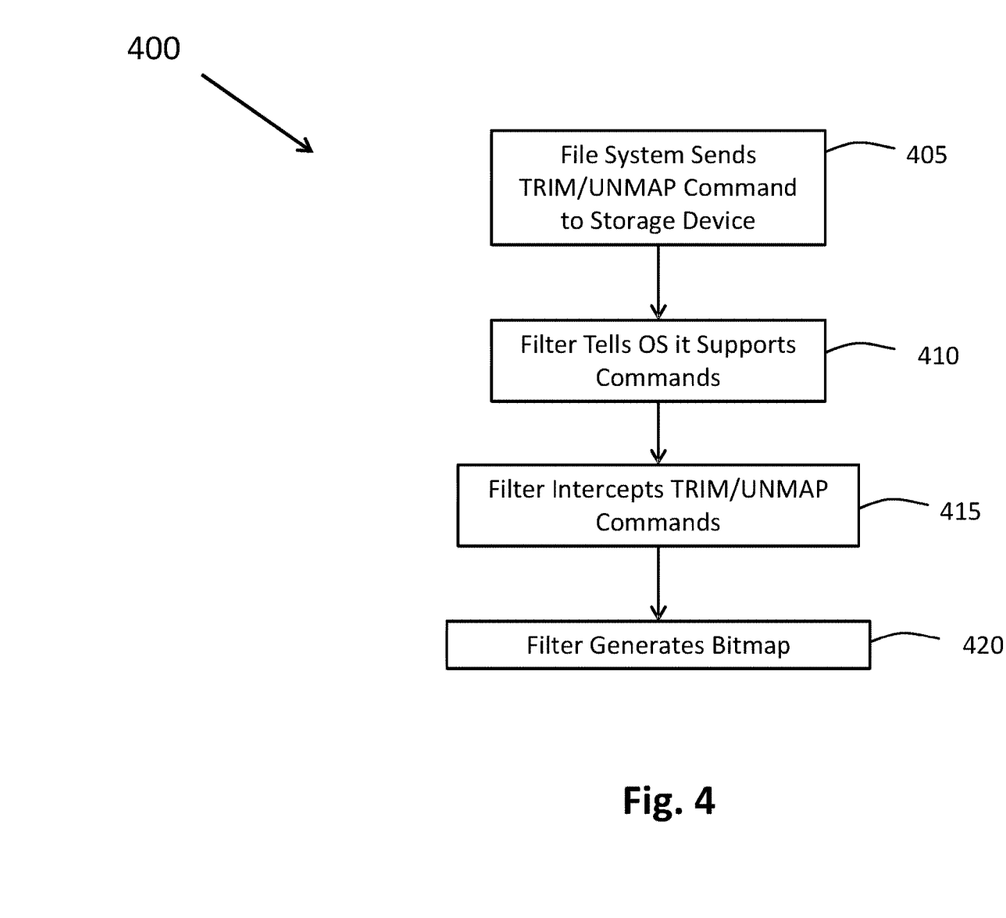
FIG. 4 illustrates a flowchart for a method of a filter driver for generating a bitmap used to generate backup data of an unsupported file system according to an exemplary aspect.

FIG. 4 illustrates a flowchart for a method 400 of filter driver generating a bitmap used for generating backup data of an unsupported file system according to an exemplary aspect. As shown, initially at step 405, the file system of the client computer (e.g., file system or file system driver 36) sends a TRIM command or UNMAP command to the storage device associated with the client computer (e.g., data archive 56 of FIG. 2). Next, at step 410, the driver filter 37 transmits a communication signal to the operating system of the client computer indicating that it supports the TRIM command or the UNMAP command. According to an exemplary aspect, the communication between the filter driver 37 and operating system can be performed by communication module 110 shown in FIG. 3, for example.

As further shown in FIG. 4, at step 415 the filter driver 37 intercepts (by command intercepting module 120, for example) some or all of the TRIM/UNMAP commands sent from the file system of the client computer (e.g., file system or file system driver 36) to the storage device associated with the client computer (e.g., data archive 56 of FIG. 2). Based on this information, the driver filter 37, and, more particularly, the bitmap generating module 130 of FIG. 3, is capable of generating a bitmap of the data from the disk to be backed up at step 420, for example. As described above, the bitmap (e.g., bitmap 22A) can exclude the free space based on information obtained from the TRIM/UNMAP commands sent from the file system of the client computer 20.

According to the exemplary aspect, the disclosed system and method is provided to generate a backup copy of the disk of client computer 20 where the file system of the computer 20 is not supported by the backup application provided for the computer to create the data backup.

Figure 5A:
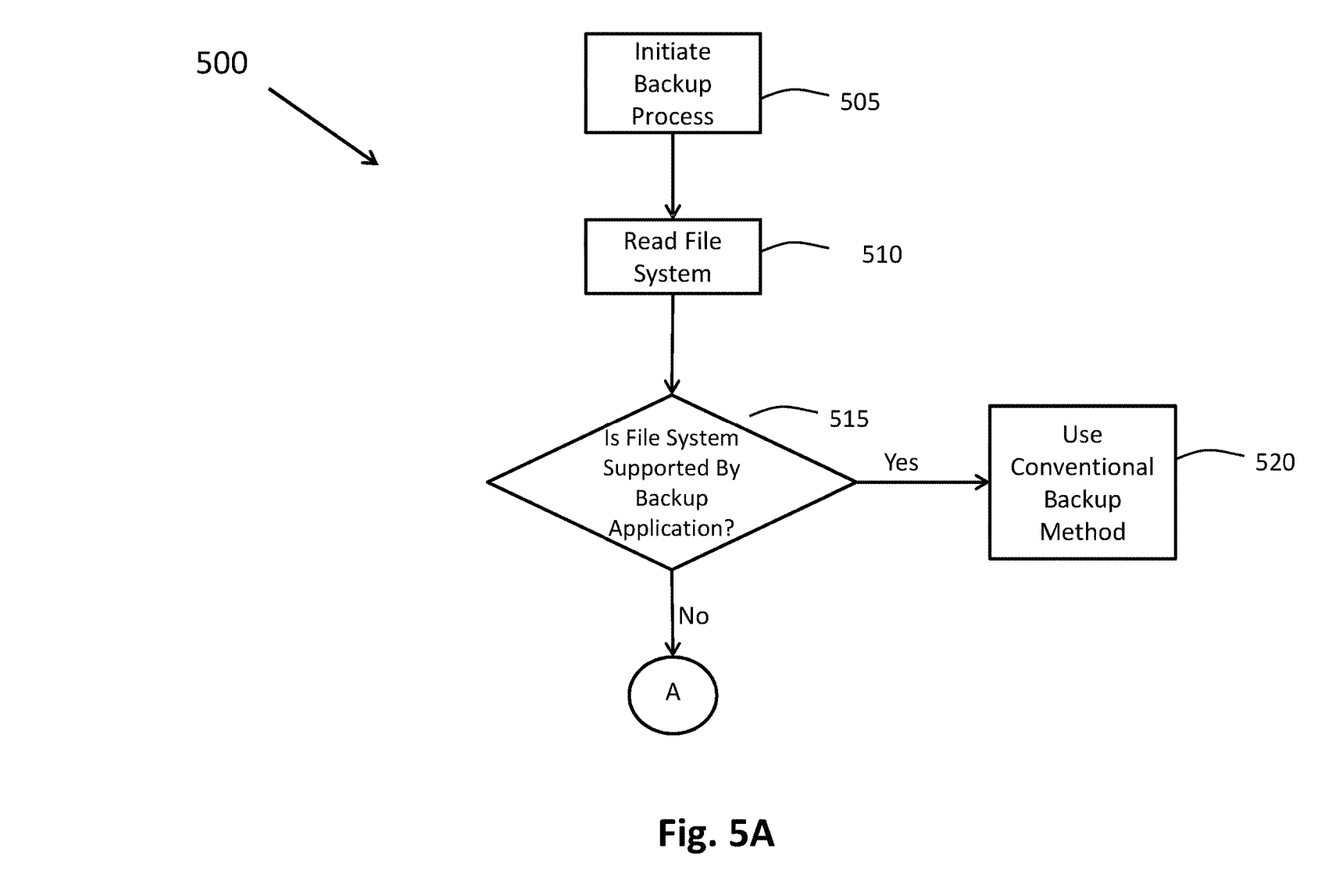
FIGS. 5A and 5B illustrate a flowchart for a method for using performance-maintaining commands for generating backup data of an unsupported file system according to an exemplary aspect.
Figure 5B:
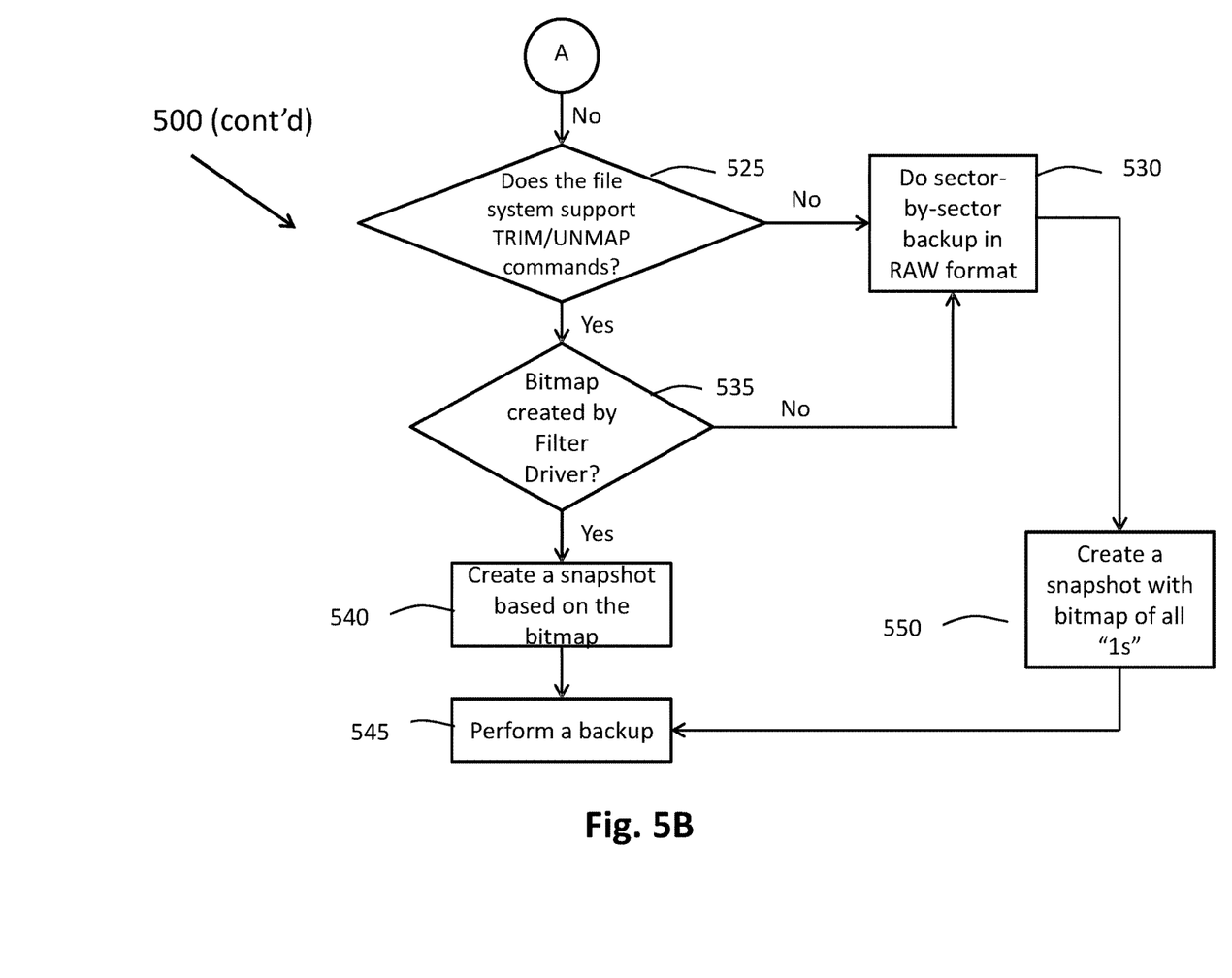

FIGS. 5A and 5B illustrate a flowchart for a method 500 for using performance-maintaining commands for generating backup data of an unsupported file system according to an exemplary aspect. As shown, initially at step 505, the client computer initiates a backup process of the user data or the like stored on the disk (e.g., the hard disk) of the client computer (e.g., computer 20 of FIG. 2). As should be appreciated to one skilled in the art, the initiation of the backup process can be either initiated by the user or automatically by the client computer 20 on a periodic basis, such as monthly or otherwise set by the operating system.

Next, at step 510, the operating system of the computer reads the file system (e.g., file system driver 36 of FIG. 2) and determines at step 515 whether the file system is supported by the specific backup application utilized by the computer. The backup software application can be provided as an "other program module 38" as shown in FIG. 6 and described below, for example. If the file system of the computer is supported by the backup application, the method proceeds to step 520, which performs a conventional backup method. According to one aspect, the conventional backup method can be the data backup process shown in FIG. 1 and described above.

If, at step 515, the operating system of the computer 20 determines that the file system 36 of the computer is not supported by the backup application, the method proceeds to step 525 as shown in FIG. 5B. At step 525, the method determines whether the file system supports the TRIM/UNMAP commands. If the file system does support these commands, the method proceeds to step 535. At step 535, the operating system of the computer queries the filter driver 37 and/or memory 22 to determine whether a bitmap 22A of the computer disk has been created according to the method described above with respect to FIG. 4. If so, the method proceeds to step 540 where the disclosed system creates a snapshot based on the bitmap (e.g., bitmap 22A, for example). More particularly, as described above, the bitmap 22A provides an indication on a sector by sector basis of which sectors of the disk of the computer 20 contain valid data and which sectors contain invalid data and/or free space. Using this information, the system can identify only those sectors of the disk that contain valid data and then access these sectors when generating the snapshot. This snapshot is used to perform a backup of the disk of the computer, where the system accesses each sector in the disk that contains valid data and creates a copy accordingly. By doing so, it should be appreciated that the system is capable of identifying free space on the disk being backed up and removing such free space from the snapshot even if the backup software application is not supported by the file system of the computer.

Referring back to steps 525 and 535, if the answer to either query is "no", the method proceeds to step 530 and the system performs a backup using the RAW format on a sector-by-sector basis. In other words, according to an exemplary aspect, if either the file system does not support the TRIM/UNMAP commands or if a bitmap has not been created by file driver 37, the exemplary method will create a backup of the hard disk of the computer using the RAW format on a sector-by-sector basis. According to this aspect, the system still can optionally proceed to step 550 to create a snapshot, although in this instance, the bitmap will include all "1s". Once this snapshot is created, the method proceeds to Step 545 and performs a backup as described above.

FIG. 6 illustrates an example of a general-purpose computer system (which may be a personal computer or a server) on which the disclosed systems and method can be implemented according to an example aspect. It should be appreciated that the detailed general-purpose computer system can correspond to the computer 20 described above with respect to FIG. 1. Moreover, the remote computer(s) 49, as described below, can correspond to the remote data storage services discussed above with respect to the exemplary system and method.

As shown in FIG. 6, the computer system 20 includes a central processing unit 21, a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate within a network environment, using a network connection to one or more remote computers 49. The remote computer (or computers) 49 are also personal computers or servers having the majority or all of the aforementioned elements in describing the nature of a personal computer 20, as shown in FIG. 3. Other devices can also be present in the computer network, such as routers, network stations, peer devices or other network nodes.

Network connections can form a local-area computer network (LAN) 50, such as a wired and/or wireless network, and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules, such as Bluetooth.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for generating a backup data copy of memory of a computer, the method comprising:
   intercepting, by a processor, a plurality of data storage commands transmitted from a file system of the computer to a storage device, wherein the file system is unsupported by a backup software application;
   interpreting the plurality of data storage commands to determine whether the commands comprise instructions to notify a storage device that one or more sectors no longer contain valid data due to user erases or operating system erases, wherein the storage device designates the one or more sectors as free space on the storage device;
   analyzing, by the processor, the plurality of data storage commands to determine at least one sector of the memory containing valid data and at least one sector of the memory no longer containing valid data;
   generating, by the processor, a data structure that indicates sectors of the memory that do not contain valid data and sectors of the memory that do contain valid data; and
   generating, by the backup software application, the backup data copy of the memory based on the at least one sector of the memory containing valid data as identified in the data structure, wherein the backup data copy excludes the free space.

2. The method according to claim 1, further comprising transmitting, by the processor, to an operating system of the computer a signal confirming that the processor supports the plurality of data storage commands.

3. The method according to claim 1, wherein the data structure is a bitmap that indicates a plurality of sectors of the memory that contain valid data.

4. The method of claim 1, further comprising:
   determining, by the processor, whether the file system is supported by the backup software application stored in the memory of the computer; and
   generating, by the processor, the backup data copy of the memory of the computer not using the data structure if the file system is supported by the backup software application stored in the memory of the computer.

5. The method of claim 1, further comprising:
   determining, by the processor, whether the file system is supported by the backup software application stored in the memory of the computer;
   determining, by the processor, whether the file system supports the plurality of data storage commands; and
   generating, by the processor, the backup data copy of the memory of the computer on a sector-by-sector basis if the file system is not supported by the existing backup software application stored in the memory of the computer and the file system does not supports the plurality of data storage commands.

6. The method of claim 1, wherein the plurality of data storage commands are at least one of a TRIM command and an UNMAP command.

7. The method of claim 1, wherein the storage device comprises a solid-state drive.

8. A computer system for generating a backup copy of data, the system comprising:
   electronic memory storing the data and a backup software application;
   a file system;
   a processor configured to:
   intercept a plurality of data storage commands transmitted from a file system of the computer system to a storage device, wherein the file system is unsupported by the backup software application;
   interpret the plurality of data storage commands to determine whether the commands comprise instructions to notify a storage device that one or more sectors no longer contain valid data due to user erases or operating system erases, wherein the storage device designates the one or more sectors as free space on the storage device;
   analyze the plurality of data storage commands to determine at least one sector of the electronic memory containing valid data and at least one sector of the memory no longer containing valid data;
   generate a data structure that indicates sectors of the electronic memory that do not contain valid data and sectors of the electronic memory that do contain valid data; and
   generate, by the backup software application, the backup data copy of the data stored in the electronic memory of the computer based on the at least one sector of the memory that contains valid data as identified in the data structure, wherein the backup data copy excludes the free space.

9. The system according to claim 8, wherein the processor is further configured to transmit to an operating system of the computer a signal confirming that the processor supports the plurality of data storage commands.

10. The system according to claim 8, wherein the data structure is a bitmap that indicates a plurality of sectors of the memory that contain valid data.

11. The system of claim 8, wherein the processor is further configured to:
   determine whether the file system is supported by the backup software application stored in the memory of the computer; and
   generate by the processor, the backup data copy of the memory of the computer not using the data structure if the file system is supported by the backup software application stored in the memory of the computer.

12. The system of claim 8, wherein the processor is further configured to:
   determine whether the file system is supported by the backup software application stored in the memory of the computer;
   determine whether the file system supports the plurality of data storage commands; and
   generate the backup data copy of the memory of the computer on a sector-by-sector basis if the file system is not supported by the existing backup software application stored in the memory of the computer and the file system does not supports the plurality of data storage commands.

13. The system of claim 8, wherein the plurality of data storage commands are at least one of a TRIM command and an UNMAP command.

14. The system of claim 8, wherein the storage device comprises a solid-state drive.

15. A non-transitory computer readable medium storing computer executable instructions for generating a backup data copy of memory of a computer having a file system unsupported by a backup software application, including instructions for:
   intercepting a plurality of data storage commands transmitted from a file system of the computer to a storage device, wherein the file system is unsupported by the backup software application;
   interpreting the plurality of data storage commands to determine whether the commands comprise instructions to notify a storage device that one or more sectors no longer contain valid data due to user erases or operating system erases, wherein the storage device designates the one or more sectors as free space on the storage device;
   analyzing the plurality of data storage commands to determine at least one sector of the memory containing valid data and at least one sector of the memory no longer containing valid data;
   generating a data structure that indicates sectors of the memory that do not contain valid data and sectors of the memory that do contain valid data; and
   generating, by the backup software application, the backup data copy of the memory based on the at least one sector of the memory containing valid data as identified in the data structure, wherein the backup data copy excludes the free space.

16. A non-transitory computer readable medium according to claim 15, further including instructions for transmitting to an operating system of the computer a signal confirming that the processor supports the plurality of data storage commands.

17. A non-transitory computer readable medium according to claim 15, wherein the data structure is a bitmap that indicates a plurality of sectors of the memory that contain valid data.

18. A non-transitory computer readable medium according to claim 15, further including instructions for:
   determining whether the file system is supported by the backup software application stored in the memory of the computer; and generating the backup data copy of the memory of the computer not using the data structure if the file system is supported by the backup software application stored in the memory of the computer.

19. A non-transitory computer readable medium according to claim 15, further including instructions for:
    determining whether the file system is supported by the backup software application stored in the memory of the computer;
    determining whether the file system supports the plurality of data storage commands; and
    generating the backup data copy of the memory of the computer on a sector-by-sector basis if the file system is not supported by the existing backup software application stored in the memory of the computer and the file system does not supports the plurality of data storage commands.

20. A non-transitory computer readable medium according to claim 15, wherein the plurality of data storage commands are at least one of a TRIM command and an UNMAP command.

21. A non-transitory computer readable medium according to claim 15, wherein the storage device comprises a solid-state drive.

\* \* \* \* \*